Aug. 29, 1933.   E. H. BENFORD   1,924,301
CHUCK FOR HOLDING BAR STOCK AND THE LIKE
Filed Dec. 10, 1930
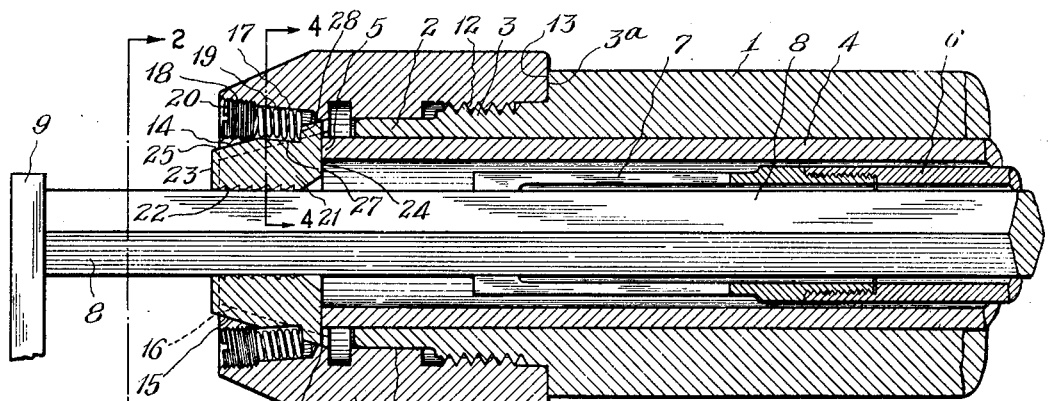
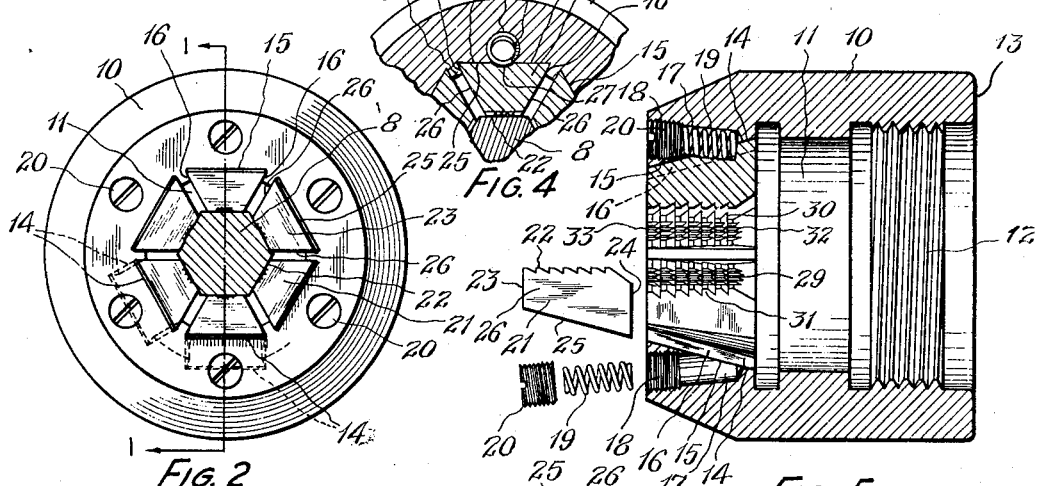
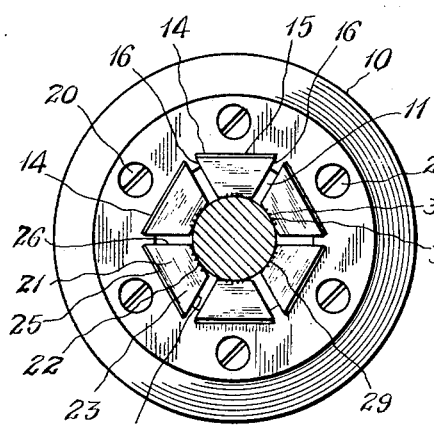
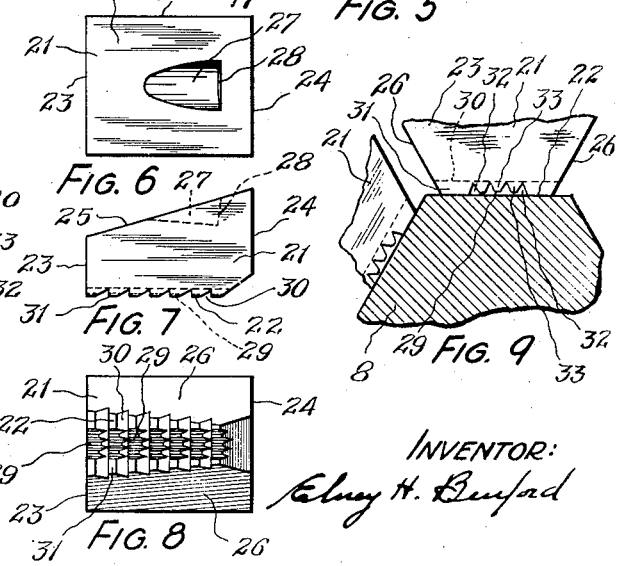
INVENTOR:
Elroy H. Benford Patented Aug. 29, 1933

1,924,301

UNITED STATES PATENT OFFICE 1,924,301

CHUCK FOR HOLDING BAR STOCK AND THE LIKE

Elney H. Benford, Cleveland, Ohio

Application December 10, 1930
Serial No. 501,252

14 Claims. (Cl. 279—60)

My invention relates to chucks adapted for use in automatic screw machines, automatic lathes and similar machine tools. The particular embodiment of this invention herein disclosed is shown and described as applied to automatic machines for holding bar stock while a portion of this stock is being machined. The type of chuck herein shown and described is a substitute for and an improvement on the usual spring collet, sometimes known as a spring chuck, which is now practically universally used in machinery of the class referred to above.

One object of this invention is to provide an improved chuck in which the gripping surfaces are parallel with the surface of the stock being gripped and in which this parallel relation of gripping surface and stock will be maintained for all sizes of stock within the capacity of the chuck.

Another object of this invention is to provide a chuck in which the stock will be gripped for the full length of the gripping bearing on the jaws and in which this full length gripping effect will be maintained for all sizes of stock within the capacity of the chuck.

Another object of this invention is to provide a chuck in which the gripping surfaces are formed on a plurality of individual jaws which are slidably mounted in a holder and which are adapted to move obliquely toward and from the stock.

Another object of this invention is to provide an improved form of this collet chuck in which the jaws are formed with flat surfaces which are in turn mounted on flat surfaces in the body or casing and in which these flat surfaces are maintained in contact with each other for all working positions of the jaws.

Another object of this invention is to provide a chuck of this type in which a firmer grip may be obtained on the stock with less wearing effect on the mechanism which controls the gripping and releasing function.

Another object of this invention is to provide a chuck of this type in which the jaws are mounted in a holder so constructed that each of the jaws may be individually removed for inspection, repairs, or renewal, with a minimum of disassembling.

Another object of this invention is to provide a chuck which may be used to accommodate a range of sizes of stock which varies quite substantially from the size of the stock for which the chuck is designed.

Another object of this invention is to provide a chuck in which stock having both a round and a polygonal cross section may be held with equal security.

Another object of this invention is to provide a chuck in which wear of the parts may be compensated for by adjustment of the control mechanism without affecting the functioning of the chuck.

Another object of this invention is to provide a chuck in which the frequent breakage due to crystallization of the usual spring collets will be eliminated and which will otherwise be durable in construction, efficient in operation and economical of manufacture.

Further objects and advantages of this invention will appear from the following description and from reference to the accompanying drawing.

The annexed drawing and description set forth in detail certain means embodying this invention, such disclosed means constituting, however, but one form in which the principle of this invention may be applied.

Figure 1 is a vertical axial section through this improved chuck showing this chuck mounted on the spindle of an automatic lathe and gripping hexagonal stock, this view being taken on the plane indicated by line 1—1 in Fig. 2.

Fig. 2 is a front elevation of this chuck, this view being taken from the plane indicated by line 2—2 in Fig. 1.

Fig. 3 is a view similar to Fig. 2 but showing this chuck applied to the gripping of round stock.

Fig. 4 is a fragmentary transverse sectional view taken in the plane indicated by line 4—4 in Fig. 1.

Fig. 5 is a vertical axial section through this chuck detached from the spindle, certain parts of this chuck being shown detached from the body.

Fig. 6 is an enlarged detached plan view of one of the jaw elements forming the gripping members of this improved chuck.

Fig. 7 is a side elevation of the jaw element shown in Fig. 6.

Fig. 8 is a bottom plan view of the jaw illustrated in Fig. 6; and

Fig. 9 is an enlarged view of a fragmentary portion of Fig. 2.

The embodiment of the invention illustrated is particularly applicable for use in the type of machine tool commonly known as automatic screw machine or automatic lathe. In this type of machine, as is well known to those skilled in the art, a hollow spindle forms one of the elements of the machine. The stock from which the parts to be machined are formed is fed through this hollow spindle in the form of a bar of suitable cross-sectional shape. This bar is firmly gripped and centered by means of a chuck at or near the point where the machining operation takes place. After each individual machining operation has been completed the chuck is caused to release the bar and mechanism is provided for feeding the bar forward against a suitable stop, whereupon the chuck again firmly grips the bar. This alternate gripping and releasing of the chuck and feeding of the bar stock is controlled by automatic devices usually mounted at the rear of the machine and which need not be shown or described as they are well known to those skilled in the art.

Referring to the drawing, 1 indicates the usual hollow rotary spindle of an automatic screw machine, this spindle being formed with a substantially cylindrical projection 2 at its front end, an exteriorly threaded portion 3 rearwardly adjacent to this front end, and with a shoulder 3a slightly to the rear of the threaded portion.

A push tube 4 is slidably mounted in the bore of the spindle 1 and is adapted to rotate therewith. This push tube is formed with a squared front end as shown at 5. Interiorly of this push tube is the usual reciprocable feed tube 6 provided at its front end with a spring feed collet 7, this collet being adapted to feed the bar stock 8, shown as a hexagonal bar in Figs. 1, 2 and 9. The means for reciprocating the push tube and feed tube consists of the usual positive cam controlled mechanism which forms a part of the standard automatic screw machine or lathe. The bar stock 8 is fed forward against the stop 9 which may be disappearing, as will be understood.

Mounted upon the front end of the spindle 1 is the chuck body 10 which constitutes the main casing or housing for my improved chuck. This body is formed with a bore 11. This bore is formed at its rear end with an internal thread 12 adapted to co-operate with the exterior threaded portion 3 on the spindle. The rear face of the chuck body 10 is preferably formed with a shoulder 13 adapted to engage the shoulder 3a on the spindle. The front end of the bore 11 is formed with a plurality of circumferentially spaced grooves 14. Each of these grooves comprises a plane, flat face or seat 15 and each groove is further bounded by side shoulders 16 formed in a generally radial plane. The flat face 15 and side shoulder 16 form, in effect, a dove-tailed groove as clearly shown in Fig. 4. As will be evident from an inspection of Figs. 1 and 5, these grooves are inclined in a downwardly and forwardly direction with relation to the axis of the opening and the axis of the bar stock being fed.

The chuck body 10 is further formed with a plurality of apertures 17, threaded at their outer ends as shown at 18. These apertures are preferably the same in number as the grooves 14 and intersect the flat faces or seats 15 of these grooves, the axes of the openings forming a slight angle with said faces. These apertures are adapted to receive compression coiled springs 19 which are held in place by the screw plugs 20, all as clearly shown in Figs. 1 and 5. These apertures are preferably drilled in the front face of the body 10 so that they may be easily and quickly accessible.

Slidably mounted in the circumferentially spaced grooves 14 are a plurality of jaws or pads 21 formed with a gripping surface indicated at 22. Each of these jaws is formed with a front face 23, rear face 24, and a flat seat portion 25. These jaws, as will be evident from Figs. 2 and 4, are formed with inwardly converging sides 26 forming, in effect, a member which is dove-tailed in cross-section. The flat seat portion 25 of the jaws is provided with a recess 27 forming a shoulder 28. These recesses and shoulders are preferably so located that they register with the apertures 17 as clearly shown in Figs. 1, 2, and 5 and in effect form a continuation of the aperture 17. It will also be apparent from these figures that the compression spring 19 is partly seated in said recess 27 and is adapted to abut the shoulder 28.

The gripping face 22 of the jaws 21 is preferably formed with a concave longitudinal recess 29, the curvature of this recess being preferably of a radius adapted to fit the periphery of the particular size of round bar stock for which the chuck is designed. As shown in Figs. 6, 7, and 8, the gripping face of these jaws is formed with a series of transverse grooves 30 forming transverse toothed projections 31, these grooves and toothed projections extending entirely across the gripping face of the jaw and including the concave recess 29. The concave recess 29 is additionally formed with longitudinal grooves 32 forming longitudinally spaced toothed projections 33.

*Operation*

The operation of this improved chuck will readily be understood by reference to the drawing. Fig. 1 illustrates the position of the parts when the bar stock 8 is being firmly gripped by the jaws 21. This gripping action is effected as follows: When the bar stock 8 has been fed forward, that is to the left as shown in Fig. 1, by the feed collet on the feed tube, against the stop 9, the push tube 4 is caused to move toward the front of the chuck by automatically controlled and timed means usually located at the rear end of the machine. The front squared end 5 of the push tube engages the rear face 24 of the gripping jaws or pads 21, thus forcing them forward. This forward motion of the jaws causes them to travel downwardly on the inclined seats 25 against the action of the springs 19. The stroke of the push tube is so adjusted that the forward motion will continue until the jaws have moved a sufficient distance toward the bar stock to firmly grip the bar stock and prevent its movement with relation to the spindle. The end of the bar stock which projects from the front face of the chuck is then machined by suitable tools, as is well known. After a predetermined time, which is sufficient to complete the particular machining operations being performed on the bar and to permit the machined portion of the bar to be cut off, the push tube is automatically moved to the rear of the machine (to the right as shown in Fig. 1). This movement of the push tube permits the spring 19 to exert a sufficient thrust against the shoulders 28 formed on the jaws 21 to cause these jaws to travel rearwardly and outwardly in the grooves 14. After these jaws are thus released, the feed tube is again actuated to feed another portion of the bar stock forward until it strikes the stop, whereupon the push tube again moves forwardly, causing the chuck jaws to grip the bar and the operation is repeated.

Transverse teeth 31 resist any rearward thrust which may be caused by the machining operation, and the tortional strain will be amply resisted by the thrust of the flat sides of the hexagonal bar, such, for instance, as is shown in Figs. 1 and 2, upon the gripping surface 22, which thrust, in turn, is well resisted by the flat seats 15 in the grooves 14. The chuck jaws illustrated are equally well adapted to hold round bar stock by virtue of the concave longitudinal recesses 29 formed in the gripping face of the jaws. The teeth 31 formed by the transverse grooves 30, in these recesses, are very effective to resist any rearward thrust by the tools as in the case of the hexagonal bar. In case of round bar stock, I find it advantageous to provide the teeth 33 formed by the longitudinal grooves 32 which provides edges adapted to indent themselves sufficiently to prevent any tortional slipping of the round bar stock.

When it is desired to remove one or more of the jaws 21, it is only necessary to remove the respective screw plug or plugs 20 in the front face of the chuck body and draw the jaw outwardly as shown in the lower portion of Fig. 5. It will be understood that the spring 19 will be moved out by the removal of the jaw.

It will be evident that when the gripping surfaces 22 of the jaws 21 are formed parallel with the surface of the bar 8, they will maintain this parallel relation to the bar regardless of their movement in the grooves 14. It will also be evident that the actual gripping contact will extend for the entire length of the gripping area. It will also be evident that due to this improved contact between the gripping surfaces and the bar stock, a firmer grip will be obtained on the bar stock with less pressure on the push tube, which will reduce the wear and strains upon the push tube actuating mechanism, thus reducing the wear on these parts.

It will further be evident that the flat surfaces 15 upon which the flat faces 25 of the jaws slide, will secure a maximum bearing area in the most efficient manner to resist the thrust and wear between the gripping jaws and the chuck body. It will also be apparent that these flat surfaces remain in efficient contact, one with the other, regardless of the position of the jaws in the grooves, that is, there will be no change in the surface contact whether the jaws are gripping an over-size bar or an under-size bar. It should be parenthetically pointed out here that this intimate engagement of the bearing surfaces over a wide range of movement of the jaws does not obtain in those cases where the bearing surfaces are conical as in the usual spring collet chuck. It will also be understood that, within the limits of their construction, a chuck of this type with jaws mounted as pointed out, will be adapted to grip bars of a comparatively wide range of sizes with equal efficiency. It will also be understood that any wear which takes place either on the gripping surfaces or on the seating surfaces of the jaws can be compensated for by adjusting the controlling mechanism in the rear of the machine without interfering with the efficiency of operation of the jaws.

It will also be clear that the pads are interchangeable and that any one pad or jaw may be quickly and easily replaced.

While I have shown six jaws equal in number to the sides of the hexagonal stock, it will be understood that three jaws might, under some circumstances, work equally efficiently for gripping and centering this bar stock, and it will also be understood that bar stock having any other number or arrangement of faces may be gripped in this improved chuck by providing a suitable number and arrangement of gripping jaws is supplied. It should also be pointed out that while dove tail grooves have been shown to maintain the jaws in sliding engagement with the seats 15, any other means may be used for maintaining this engagement, such as the T groove, for instance, or separate gibs or keys. It will also be evident that a flat gripping surface might be used on the jaws in place of the toothed surfaces shown in the drawing.

While this invention has been described particularly in its application to an automatic screw machine, it should be pointed out that this improved device can equally well be used on other types of equipment for machining or forming metals or other materials. This device is shown actuated by a push tube mechanism, but it is important to note that, in its broader aspects, this device is also adapted for actuation by a pull tube type of mechanism which is frequently used in automatic machines of the type to which this chuck may be applied.

Many other modifications of this invention and its application will naturally occur to those skilled in the art and the present disclosures should therefore be considered only as typical, and I desire not to be limited to the exact constructions shown and described.

What I claim is:

1. A chuck comprising a body formed with a longitudinal axial opening, said opening being formed with a plurality of flat surfaces inclined with relation to the axis of said opening, clamping jaws formed with flat seats slidably mounted on said inclined surfaces, and resilient means adapted to move said jaws outwardly from the axis of said opening, a portion of said resilient means lying within and projecting above said inclined surfaces.

2. A chuck comprising a body formed with an axial opening, said opening being formed with a plurality of seats inclined toward the axis of said opening, gripping jaws slidably mounted on said seats, each of said jaws being formed with a gripping surface, a seat surface and a shoulder, said shoulder being formed intermediate the ends of said seat surface means adapted to hold said jaws in engagement with said seats and compressible means mounted in the body intermediate the ends of the seats and adapted to engage said shoulder and to slide said jaws on said seats.

3. A chuck comprising a body formed with an axial opening, said opening being formed with a plurality of grooves each formed with a seat inclined toward the axis of said opening, gripping jaws slidably mounted on said seats and formed with a shoulder, an aperture formed in said body and passing thru said seat and substantially registering with said shoulder and means inserted in said aperture adapted, when engaging said shoulder to prevent the removal of said jaws from said groove.

4. A chuck comprising a body formed with a bore, said bore being formed with a plurality of seats inclined toward the axis of said bore, gripping jaws slidably mounted on said seats and formed with a shoulder, an aperture formed in the body at an angle to and intersecting said seat and substantially registering with said shoulder, spring means inserted in said aperture to yieldingly move said seat in one direction and to stop its movement at a predetermined point in the other direction.

5. A chuck for gripping bar stock and the like, comprising a body formed with a bore, said bore having its rear end adapted to be mounted on a spindle and formed with a plurality of grooves at its front end, said grooves being inclined toward the axis of said bore, a jaw slidably mounted in each of said grooves, means adapted to hold said jaws in said grooves, and stops mounted in said body and projecting into said grooves adapted to prevent the removal of said jaws from said grooves, said stops being removably mounted in the front end of said chuck.

6. A chuck for gripping bar stock comprising a body formed with a bore and an end face, a plurality of grooves formed in said bore and inclined toward said end face and downwardly toward the axis of said bore, a plurality of gripping jaws each mounted in one of said grooves, means adapted to hold said jaws slidably in said grooves, and a plurality of resilient removable stops mounted in the body radially outwardly of the grooves and projecting into the grooves and adapted to prevent the removal of said jaws from said grooves in a direction toward said end face.

7. A chuck for gripping bar stock comprising a body formed with a bore, a plurality of jaws mounted in said body for reciprocation in a direction inclined with the axis of said bore, said jaws being formed with a toothed gripping surface adapted to grip both a polygonal and a cylindrical bar, this surface including a plane toothed portion and a concave toothed portion, the plane portion being formed with serrations adapted to prevent the axial movement of the polygonal bar and the concave portion being formed with serrations adapted to prevent both the axial and rotational movement of the round bar.

8. A chuck for gripping bar stock comprising a body formed with a bore, a plurality of jaws mounted in said body for reciprocation in a direction inclined with the axis of said bore, said jaws being formed with a gripping surface adapted to grip bar stock, this surface being formed with longitudinal plane areas and with a concave surface, said plane areas being faced with teeth formed by grooves running transversely of the axis of said bar stock, and said concave surface being faced with teeth formed by intersecting grooves running transversely of and parallel to said bar stock.

9. In an automatic screw machine or the like, gripping mechanism for continuous bar stock comprising a hollow rotary spindle, a chuck body mounted on said spindle and formed with a bore and a front and rear face, the rear face abutting a shoulder in said spindle, a plurality of independent circumferentially spaced reciprocable gripping jaws mounted in said chuck body for inclined movement with relation to the axis of said bore, positive means adapted to move the jaws toward said stock and resilient means tending to release said jaws from said stock, said resilient means being accessible from said front face for adjustment.

10. In mechanism of the character described, in combination a hollow rotary spindle, a chuck body having a front end and a rear end, said rear end mounted on said spindle and said body being formed with a bore provided with a plurality of circumferentially spaced flat seats inclined toward the axis of said bore, a plurality of independent gripping jaws reciprocably mounted on said seats, means for holding said jaws against said seats, positive means adapted to move said jaws axially in one direction and resilient means adapted to move said jaws to the opposite direction, said resilient means being removably mounted in said front end.

11. Gripping mechanism for bar stock comprising a hollow rotary spindle, a chuck body formed with a working face at one end and mounted for rotation with said spindle at the other end and formed with a bore, a plurality of circumferentially spaced longitudinal grooves formed in said bore, said grooves being inclined toward the axis of said bore, a plurality of independent gripping jaws slidably confined in said grooves, positive means adapted to move said jaws axially in one direction and resilient means adapted to move said jaws in the opposite direction, said resilient means and said jaws being arranged to permit the removal of said jaws from the working face of the chuck.

12. Gripping mechanism adapted to alternately grip and release continuous bar stock passing therethrough comprising a hollow rotary spindle, a chuck body mounted for rotation with said spindle and formed with a bore, said bore being formed with a plurality of circumferentially spaced plane surfaces inclined toward the axis of the stock, a plurality of independent gripping jaws having flat faces slidably mounted on said plane surfaces, an element mounted within said spindle adapted to move said jaws to said gripping position and resilient elements mounted in said chuck adapted to move said jaws to said releasing position.

13. In chucking mechanism adapted to alternately grip and release continuous bar stock passing therethrough, in combination, a rotating spindle, a chuck head mounted for rotation with said spindle and formed with a bore, said bore being formed with a plurality of circumferentially spaced dove tail grooves, a plurality of gripping jaws formed with a dove tailed portion adapted to slidably engage said grooves, a push tube mounted within said spindle and adapted to move said jaws to the gripping position and coiled compression spring elements adapted to move said jaws to the releasing position.

14. A chuck for gripping bar stock comprising a body formed with a bore, a plurality of jaws mounted in said body for reciprocation in a direction inclined with the axis of said bore, said jaws being formed with a duplex gripping surface, one portion of this surface comprising lateral plane toothed gripping areas, the other portion of this surface comprising a central concave cylindrical toothed gripping area intermediate said lateral areas, substantially as described.

ELNEY H. BENFORD.